(12) United States Patent
Reif et al.

(10) Patent No.: US 9,396,408 B2
(45) Date of Patent: Jul. 19, 2016

(54) TECHNIQUES FOR IMPROVING STEREO BLOCK MATCHING WITH THE PYRAMID METHOD

(75) Inventors: Dror Reif, Be'er-Yacoov (IL); Ziv Aviv, Bat Hefer (IL); David Stanhill, Hoshaya (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,907

(22) PCT Filed: Dec. 15, 2011

(86) PCT No.: PCT/US2011/065237
§ 371 (c)(1),
(2), (4) Date: Jun. 24, 2014

(87) PCT Pub. No.: WO2013/089752
PCT Pub. Date: Jun. 20, 2013

(65) Prior Publication Data
US 2014/0355891 A1    Dec. 4, 2014

(51) Int. Cl.
*G06K 9/00* (2006.01)
*G06K 9/62* (2006.01)
*G06T 7/00* (2006.01)
*H04N 13/00* (2006.01)

(52) U.S. Cl.
CPC ............ *G06K 9/6202* (2013.01); *G06T 7/0022* (2013.01); *G06T 7/0051* (2013.01); *G06T 7/0075* (2013.01); *G06T 2207/10012* (2013.01); *G06T 2207/20016* (2013.01); *H04N 2013/0074* (2013.01)

(58) Field of Classification Search
CPC ............ G06T 7/00; H04N 13/00; G06K 9/00
USPC ............ 382/107, 154, 167; 348/43, 42, 129, 348/134, 161, 179, 414.1
See application file for complete search history.

(56) References Cited

U.S. PATENT DOCUMENTS

| | | | | |
|---|---|---|---|---|
| 5,179,441 | A  * | 1/1993 | Anderson | G06K 9/32 348/43 |
| 6,487,304 | B1 * | 11/2002 | Szeliski | G06K 9/20 382/107 |
| 8,009,897 | B2 * | 8/2011 | Xu | G06K 9/32 348/47 |
| 2004/0105580 | A1 * | 6/2004 | Hager | G06T 7/0077 382/154 |
| 2011/0175912 | A1 | 7/2011 | Beeler et al. | |
| 2011/0176722 | A1 | 7/2011 | Sizintsev et al. | |

OTHER PUBLICATIONS

International Search Report and Written Opinion mailed Sep. 7, 2012 for corresponding PCT/US2011/065237 filed Dec. 15, 2011 (nine (9) pages).

* cited by examiner

Primary Examiner — Abolfazl Tabatabai

(57) ABSTRACT

Techniques to determine a search range for a stereo based matching pyramid. A first disparity estimation value for a first level in a stereo based matching pyramid based on an image may be received. A search range for a second level may be determined using the first disparity estimation value. The search range based on a pyramid level of a second level may be increased. The search range may be increased based on a pyramid level of the second level. A second disparity estimation value may be selected from the search area for the second level. A depth map for the second level may be determined based on the second disparity estimation value. Other embodiments are described and claimed.

21 Claims, 8 Drawing Sheets

200

- RECEIVE A FIRST DISPARITY ESTIMATION VALUE FROM A FIRST LEVEL IN A STEREO BASED MATCHING PYRAMID BASED ON AN IMAGE
  202

- DETERMINE A SEARCH RANGE FOR A SECOND LEVEL BASED ON THE FIRST DISPARITY ESTIMATION VALUE
  204

- INCREASE THE SEARCH RANGE BASED ON A PYRAMID LEVEL OF THE SECOND LEVEL
  206

- SELECT A SECOND DISPARITY ESTIMATION VALUE FROM THE SEARCH RANGE FOR THE SECOND LEVEL
  208

- DETERMINE A DEPTH MAP FOR THE SECOND LEVEL BASED ON THE SECOND DISPARITY ESTIMATION VALUE
  210

*FIG. 2*

TECHNIQUES FOR IMPROVING STEREO BLOCK MATCHING WITH THE PYRAMID METHOD

BACKGROUND

Stereo block matching methods are typically used for creating disparity maps by mapping or comparing pairs of rectified images. The rectified images are matched using a dense correspondence for every pixel in the left image into the right image.

Pyramid based methods are typically used for coarse to fine computations. However, the pyramid approach for stereo based matching typically results in poor recovery of thin objects. Thin objects get lost in coarse higher levels of the pyramid due to the low resolution. For example, a finger object in an image in a coarsest level may include a thin object represented by only two or three pixels. As coarse levels have less information about high frequencies, the finger object may not be visible and may blend into the background. It is with respect to these and other considerations that the present improvements have been needed.

BRIEF DESCRIPTION OF THE DRAWINGS

FIG. 2 illustrates an embodiment of a logic flow for the system of FIG. 1.

DETAILED DESCRIPTION

Figure 1:
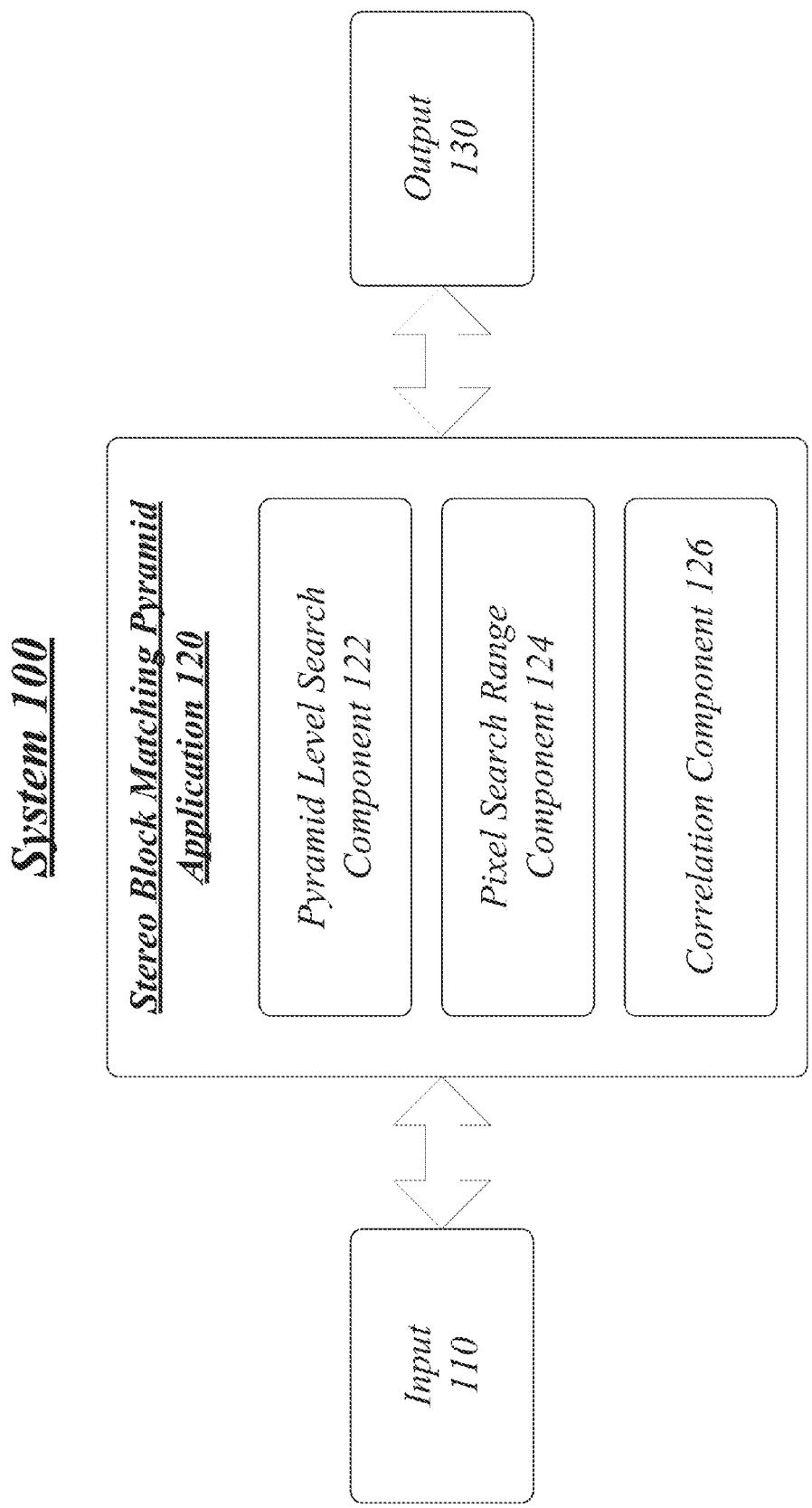
FIG. 1 illustrates an embodiment of a system.

Various embodiments are directed to improving stereo based matching using pyramid based techniques. In an embodiment, stereo based matching using a pyramid method may be performed on an image. In an embodiment, first disparity estimation value for a first level in a stereo based matching pyramid based on an image may be received. In an embodiment, a stereo based matching pyramid may include a plurality of levels. Disparity estimation for a first level may be determined. The disparity estimation may be received in order to determine a search range for a second level.

In an embodiment, a search range for a second level may be determined using the first disparity estimation value. In an embodiment, disparities surrounding the first disparity estimation value may be used to determine a search range.

In an embodiment, the search range for a second level may be increased. In an embodiment, the search range for the second level may be increased based on a pyramid level of the second level. As coarse levels may include less information about high frequencies, thin objects may not be visible and may blend into the background. In an embodiment, by increasing the search range, there may be an increased likelihood that the depth map may include thin objects from the original image as the search allows new details of the image to be determined.

In an embodiment, a second disparity estimation value may be determined from the search range from the second level. In an embodiment, the second disparity estimation value may be selected based on a correlation score.

In an embodiment, a depth map for the second level may be determined using the second disparity estimation value for the second level. In an embodiment, the depth map may be calculated based on the second disparity estimation value for the second level. By increasing the search range, an accurate depth map may be determined.

An adaptive search range for the pyramid based method may be performed according to the nature of the image. By determining a search range based on the nature of the image at a level in the pyramid, the disparity map for that level may be improved while performance is increased and power consumption is reduced. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a system 100. In one embodiment, the system 100 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

In an embodiment, the system 100 may include a stereo block matching pyramid application 120. In an embodiment, the stereo block matching pyramid application 120 may include a pyramid level search range component 122. In an embodiment, an image may be displayed on multiple pyramid levels. In an embodiment, the first pyramid level, level 0, may display an original image. The next pyramid level, level 1, may include an image that is smaller in dimensions and has lower resolution. For example, the image on level 1 may be half the size of the image on a prior level, level 0. In an embodiment, the image on level 2, the next level, may be half the size of the image on the prior level, level 1, The image on level 2 may have a lower resolution then the image on level 1.

A pyramid may include multiple levels. In an embodiment, a pyramid may include at least a first level and a second level. A first level may be level 2 and a second level may be level 1. A first level may be level 6 and a second level may be level 5. In an embodiment, a second level may immediately follow a first level. In an embodiment, the first level may be higher on the pyramid then the second level. In an embodiment, the image in the first level may be coarser, have smaller dimensions and less resolution then the image in the second level.

In an embodiment, a first disparity estimation value from a first level in a stereo based matching pyramid may be received. In an embodiment, an image may be an input 110 into the stereo block matching pyramid application 120. In an embodiment, the image for the input 110 may include left and right original and rectified images.

A search range for a second level may be determined using the first disparity estimation value. In an embodiment, the search range may be increased for the second level. In an embodiment, a second disparity estimation value from the search range for the second level may be selected.

In an embodiment, the pixel search range component 124 may calculate a Laplacian value and determine the search range for the second level based on the Laplacian value. In an embodiment, the search range component 124 may determine that a target object is in the disparity search range for a second level and that the target object is not presented in a prior or first level of the pyramid. The search range component 124 may increase the disparity search range within the second level. In an embodiment, the search range component 124 may increase the search range when the search range includes edges. In an embodiment, the search range for the second level may remain the same when the search range includes smooth areas.

The stereo block matching pyramid application 120 may include a correlation component 126. The correlation component 126 may determine a correlation score based on a correlation such as, but not limited to, a normalized cross-correlation (NCC), the sum of absolute differences (SAD) or a local binary pattern (LBP) correlation.

In an embodiment, an output 130 of the stereo block matching pyramid application 120 may include a disparity map. In an embodiment, the disparity map output 130 may be a depth map for the second level that is determined as a result of the second disparity estimation value.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 2 illustrates one embodiment of a logic flow 200. The logic flow 200 may be representative of some or all of the operations executed by one or more embodiments described herein.

In the illustrated embodiment shown in FIG. 2, the logic flow 200 may receive a search range for first disparity estimation value from a first level in a stereo based matching pyramid based on an image at block 202. In an embodiment, a stereo based matching pyramid may comprise a plurality of levels. At each level, a first disparity estimation value may be determined. A first disparity estimation value may be determined at an upper level of the pyramid. At the next level down, the disparity search range may be refined for that lower level.

The logic flow 200 may determine a search range for a second level based on the first disparity estimation value at block 204. For example, the search range for a pyramid may be determined beginning with the first or top level. Based on a search range for a first disparity estimation value of a prior or upper level, the search range for a subsequent or lower level may be determined.

The logic flow 200 may increase the search range based on a pyramid level of the second level at block 206. In an embodiment, it may be determined whether to increase the search range by comparing an image at the second level with an image at the first level. The search range may be increased when a thin object is presented in an image at the second level and the thin object is not presented on an image at the first level.

When an image on the second level includes a thin object that was not included in an image on the first level, the search range may be increased. In an embodiment, when the second level includes thin objects that are not presented or visible at the coarse levels, the search range may be increased. The amount that the search range may be increased may be determined based on the pyramid level. In an embodiment, instead of determining that the search range for the second level may be plus or minus one of the first disparity estimation value from the first level, the search range may be increased by a different amount. The search range may be increased different amounts for different levels of the pyramid. In an embodiment, the search range may be increased based on the detail of the image at the particular level.

For example, the first level may be level 5 of the pyramid and the second level may be level 4 of the pyramid. The search range may be increased because there are new thin objects in the image on level 4 that were not presented on the image at the level 5. The amount the search range may be increased may be based on the pyramid level, as the second level is level 4 of the pyramid, the search range may have a larger increase. If the first level was level 2 and the second level was level 1 and there were new thin objects on the second level, the search range may be slightly increased because the second level is level 1.

By increasing the search range, the disparity map may be improved. As increasing the search range at a level may increase the noise or mismatches during the stereo based matching computation, the amount the search range may increase may depend on the level of the pyramid.

The logic flow 200 may select a second disparity estimation value from the search range for the second level at block 208. For example, when the second level includes thin objects that are not presented in the first level, then the search range may be increased. In an embodiment, the level of the pyramid may be taken into consideration when increasing the search range. Increasing the size of the search range may not improve the disparity map as increasing the size may increase noise and create a larger opportunity for a mismatch. By increasing the search range when the objects are thin and not presented in a prior level of the pyramid, the disparity map may be improved. In an embodiment, the second disparity estimation value may be selected from the search range for the second level based on a correlation score. In an embodiment, a second disparity estimation value may be selected from the search range based on a sum of absolute differences on a gradient times an absolute difference of a gray. In an embodiment, a second disparity estimation value may be selected from the search range based on a local binary pattern.

The logic flow 200 may determine a depth map for the second level based on the second disparity estimation value at block 210. In an embodiment, a depth map for the second level may be determined. In an embodiment, a depth map for a pyramid level may be determined using the disparity estimation value and increasing the search range from the prior pyramid level based on the image.

Figure 3:
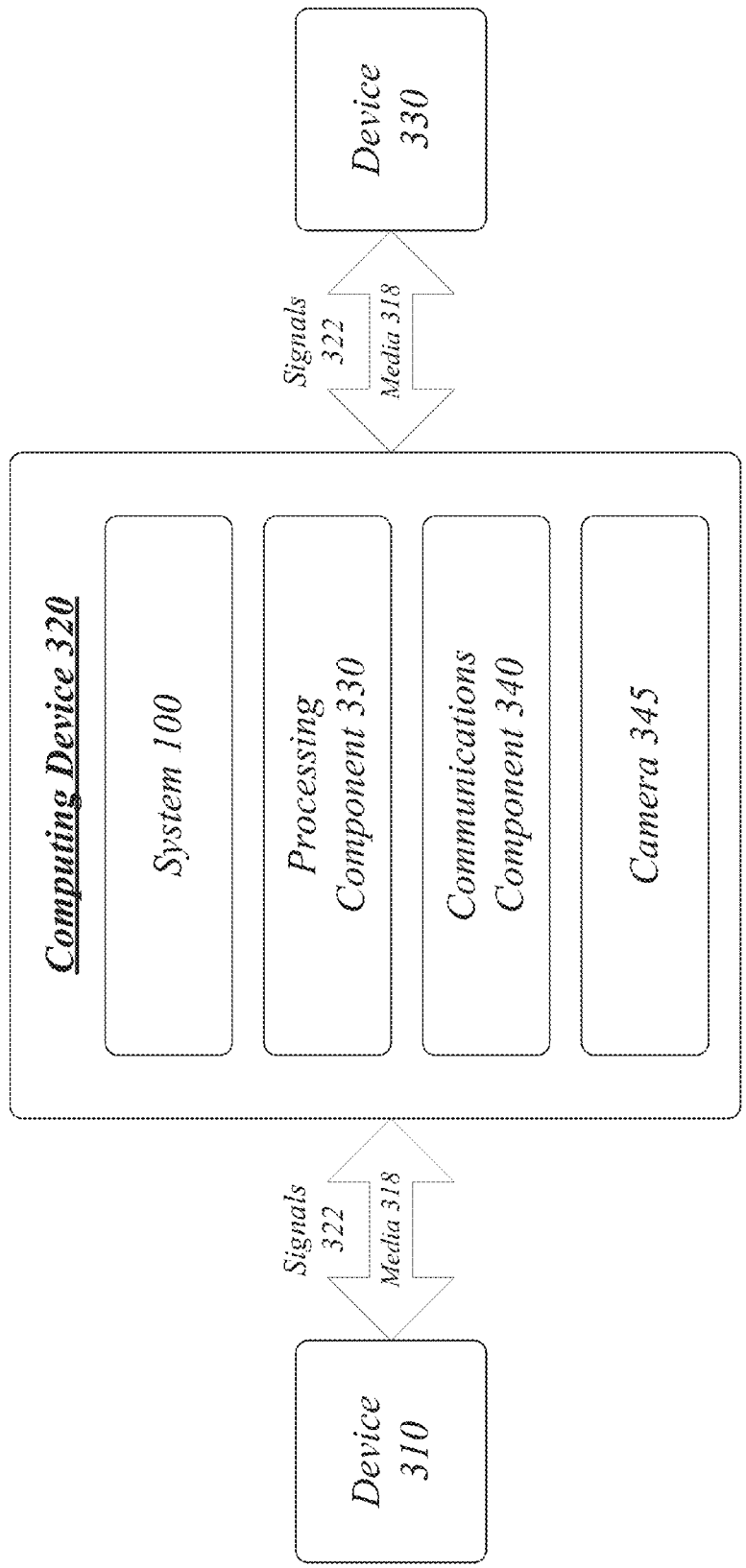
FIG. 3 illustrates an embodiment of a centralized system for the system of FIG. 1.

FIG. 3 illustrates a block diagram of a centralized system 300. The centralized system 300 may implement some or all of the structure and/or operations for the system 100 in a single computing entity, such as entirely within a single computing device 320.

The computing device 320 may execute processing operations or logic for the system 100 using a processing component 330. The processing component 330 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 320 may execute communications operations or logic for the system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 318 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 318.

The computing device 320 may communicate with other devices 310, 330 over a communications media 318 using communications signals 322 via the communications component 340.

The computing device 320 may further include one or more cameras 345. The cameras 345 may obtain and/or receive the image for the stereo block matching pyramid application 120. The camera may obtain rectified images. The camera may obtain a left image and a right image.

Figure 4:
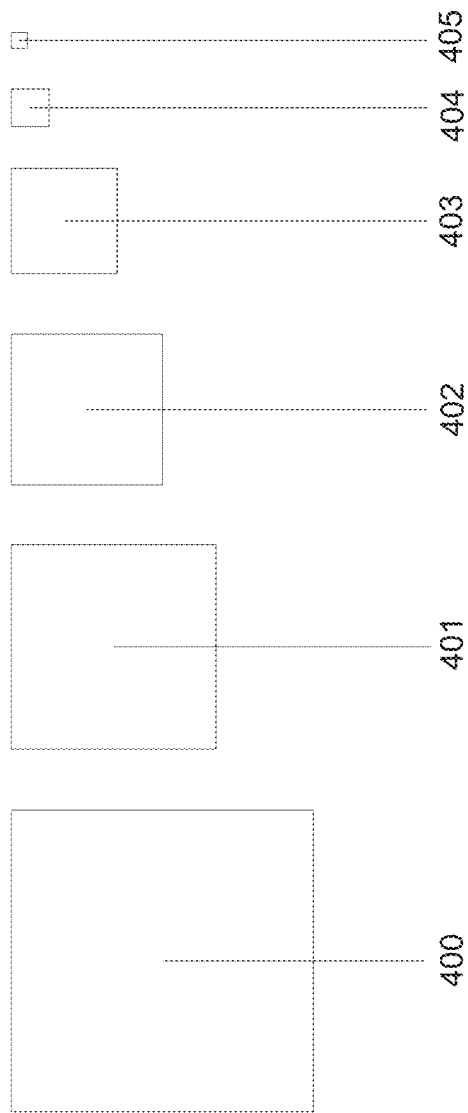
FIG. 4 illustrates an embodiment of the pyramid levels.

FIG. 4 illustrates an embodiment of the pyramid levels. In an embodiment, a stereo depth matching pyramid may be determined. In an embodiment, each level of the pyramid may include an image with different dimensions and a different resolution. In an embodiment, beginning at the bottom or largest level of the pyramid, each level going towards the top of the pyramid may include an image with smaller dimensions and a smaller resolution. For example, each image may be scaled down by a half of the resolution size of the image on the previous level. At some point, it may be determined that it is unnecessary to further scale down the image and create another level of the pyramid. For example a 640*480 pixel resolution image may be scaled down to a 10*7 pixel resolution image. At level seven, the image resolution may be 10*7 and as the image is very small, there may be no reason to create a smaller image. In an embodiment, a pyramid may have seven levels. In an embodiment, a pyramid may have ten levels. In an embodiment, a pyramid may have five levels. Depending on the original resolution of an image, a different number of levels for a pyramid may be determined.

For example, a first level, level 0, may include an image with a N*N pixel resolution. The second level, level 1, may include an image with a N/2*N/2 pixel resolution. The third level, level 2, may include an image with a N/4*N/4 pixel resolution. The fourth level, level 3, may include an image with a N/8*N/8 pixel resolution.

FIG. 4 may include six levels of a pyramid. Level 0 may be the first level 400. Level 0 400 may be the original image in full dimension and full resolution. Level 1 may be the second level 401. The second level 401 may be an image with half the resolution of the first level 400. The third level may be level 2 401. The fourth level may be level 3 403. The fifth level may be level 4 404 and the sixth level may be level 5 405.

Stereo based matching may occur at each level of the pyramid. In an embodiment, the search range may be set per pyramid level. By setting a search range for each level of the pyramid for a stereo based matching computation, the levels which the most relevant objects appear may be searched more than the levels with less relevant objects.

In an embodiment, the disparity calculation may be determined from the smallest image to the largest image. In an embodiment, the disparity calculation may begin with level 5 405. After determining a first disparity estimation value for a first level 405, a search range for a second level, level 4 404, may be determined using the first disparity estimation value. The disparity estimation value for a first or previous level 405 may be used to determine an initial disparity estimation value for the second level 404. The search range for the second level 404 may be determined based on the level of the pyramid and the nature of the image around the disparity estimation value. For example, the disparity estimation value based on the previous or first level 405 may be 10 and the search range for the fourth level in the pyramid may be plus and/or minus 3, so the search range for the second level 404 may be between 7 and 13.

Current techniques add and subtract a certain predetermined number to the first disparity estimation value to use for the search range for the second level. For example, a first level may have a first disparity estimation value of 10. Current techniques would determine a second level to have a search range of 9 through 11. However, current techniques do not take into account thin objects which may be presented at a second level and not at a first level. Using current techniques, disparity maps for the second level may be unclear as essential thin objects may be blurred.

In an embodiment, determining a search range at each level may increase the accuracy of the depth map. A search range may be determined for each level of the pyramid. In an embodiment, the search range for one or more levels of the pyramid may be increased. In an embodiment, the search range for a second level may be increased based on the image. For example, when there is a thin image in a second level that was not visible at the prior coarse first level, the search range may be increased. The amount that the search range is increased may be based on the pyramid level. In an embodiment, the search range may be increased by a small offset such as plus/minus one or two. In an embodiment, the search range may be increased by a large offset such as plus/minus twenty or fifty.

In an embodiment, the search range may be increased when there are one or more new thin objects in the second level which were not visible on the previous first level. In an embodiment, the amount that the search range may increase may be based on the pyramid level. For example, at level two 402 and/or three 403, the search ranges may be increased since the interesting thin objects, such as a finger, may begin to appear at these levels of the pyramid. In an embodiment, on level one 401, the search range may be increased by a small amount since increasing the search range at this level may cause a lot of noise. In an embodiment, an optimal level in which to increase the search range may be when the thin objects are first visible and the image is not too fine to cause a lot of noise. The embodiments are not limited to these examples.

By providing different search range sizes to different pyramid levels, the likelihood of missing a thin object associated with a smaller search range may be balanced with the likelihood of a mismatch and the noise associated with a larger search range. By adapting the search range per pyramid level, a good tradeoff can be reached between noise level and recovery of thin objects.

Figure 5:
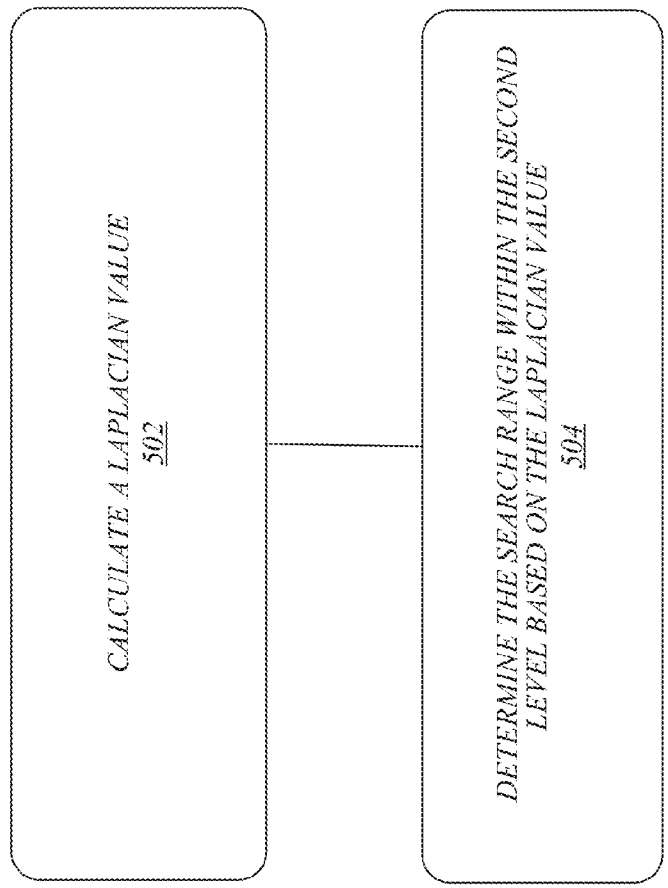
FIG. 5 illustrates an embodiment of a flow chart of changing a search range within a level of pyramid.

FIG. 5 illustrates an embodiment of a flow chart of changing a search range within a level of pyramid. In current techniques, the problems of recovery based on constant search ranges at each pyramid level may create inaccurate disparity maps. For example, thin objects in coarse levels of a pyramid may disappear on the disparity map due to the high frequencies. By increasing the search ranges in areas in which a Laplacian value is high, computing resources and power can be saved and the overall noise may be reduced. In an embodiment, large search ranges may be limited to areas in which a Laplacian value is high. When a Laplacian value is high, thin objects may not be visible in a previous or first level. A high Laplacian value may indicate the image includes edges, increasing a search area may produce accurate depth maps during stereo matching.

The logic flow 500 may be representative of some or all of the operations executed by one or more embodiments described herein. In the illustrated embodiment shown in FIG. 5, the logic flow 500 may calculate a Laplacian value for a search range at block 502. In an embodiment, the Laplacian value may be a good indication for high frequencies and objects that appear from one stereo based matching pyramid level to another. The areas with high frequencies often have poor recovery results due to the nature of the pyramid. As a result, the Laplacian value may be used to determine when a search range may be increased for areas within the pyramid.

In an embodiment, the Laplacian value may be used to increase the search range in areas with edges. Areas with edges often include detailed information and can be part of a larger search range. By using the Laplacian values, the computing power may be saved by decreasing the amount of computational power needed. By using the Laplacian value, less noise may be introduced to the depth map while recovering the fine high frequency objects.

The logic flow 500 may determine the search range within the second level based on the Laplacian value at block 504. In an embodiment, when the Laplacian value is high, then the location may have sharp edges with detailed information and the search range may be increased. A large search range may be used as the information in the image is detailed. In an embodiment, the Laplacian value may be a high value when the image includes strong, sharp edges. In an embodiment, when the Laplacian value is high, the search range may be increased. For example, the search range may be increased by ten. For example, the search range may be increased by twenty five. In an embodiment, when the Laplacian value is low, the area on the image may be smooth without a lot of detailed information and the search range may not be increased.

Figure 6:
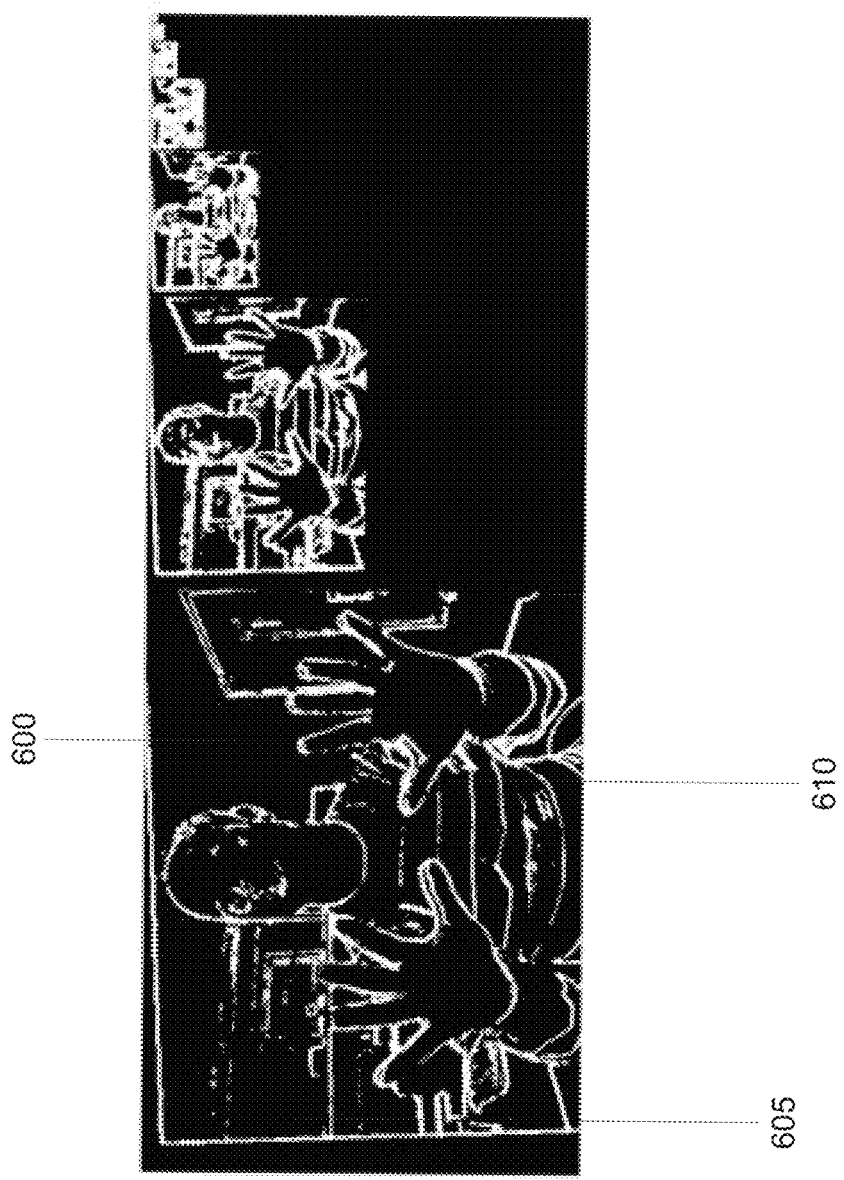
FIG. 6 illustrates an embodiment of the images in the pyramid levels.

FIG. 6 illustrates an embodiment of the images in the pyramid levels. For example, the search range within a level of the pyramid may be increased based on the objects in the image 600 in that level. A black wall 605 in an image 600 may be smooth and may include a low Laplacian value. As a result, the search range around the black wall 605 may not be increased. The image 600 in the pyramid level may include a finger 610. The finger 610 may have sharp edges and have a high Laplacian value. As a result, the search range around the finger 610 may be increased to create a large search range.

In an embodiment, a correlation function may be determined for stereo based matching using the pyramid levels. Correlation may be performed in stereo based matching as a pixel in the left image may be compared or matched with a pixel in the right image. In an embodiment, correlation may be performed for a pixel in a small environment such as, but not limited to an image resolution of 5*5. In an embodiment, the small environment around a pixel may be a support window. The support window may be used to compare pixels in the left image with pixels in the right image.

In an embodiment, a correlation function such as normalized cross-correlation (NCC) may be typically used. However, NCC may be highly complex and use a lot of computational power.

Instead of using NCC, the sum of absolute differences (SAD) on the gradient value times the absolute different on the gray may be used for pyramid stereo based matching computations. Using the SAD function for a sobel image may be as accurate as the NCC and may be much less complex and improve power consumption. In an embodiment, any decreases in quality due to the SAD function may be resolved by the other states of the stereo based matching computation.

In an embodiment, using SAD on the X direction in a gradient of the gray level may provide accuracy similar to the NCC, with much less computation. As shown in Equation 1 below, the AD(x, y) may represent the absolute difference on the gray and GRADIENT(x, y) may represent the gradient where L is the left image and R is the right image.

$$AD(x, y) = |L(x, y) - R(x', y')|$$

$$GRADIENT(x, y) = \left|\frac{\partial}{\partial x}L(x, y) - \frac{\partial}{\partial x}R(x', y')\right|$$

Equation 1

In an embodiment, a local binary pattern (LBP) correlation may be used for the stereo based matching. A LBP correlation may be accurate and cause much less complexity than a NCC. A LBP correlation may improve power consumption over a NCC. In an embodiment, any decreases in quality due to a LBP correlation function may be resolved by the other states of the stereo based matching computation.

Figure 7:
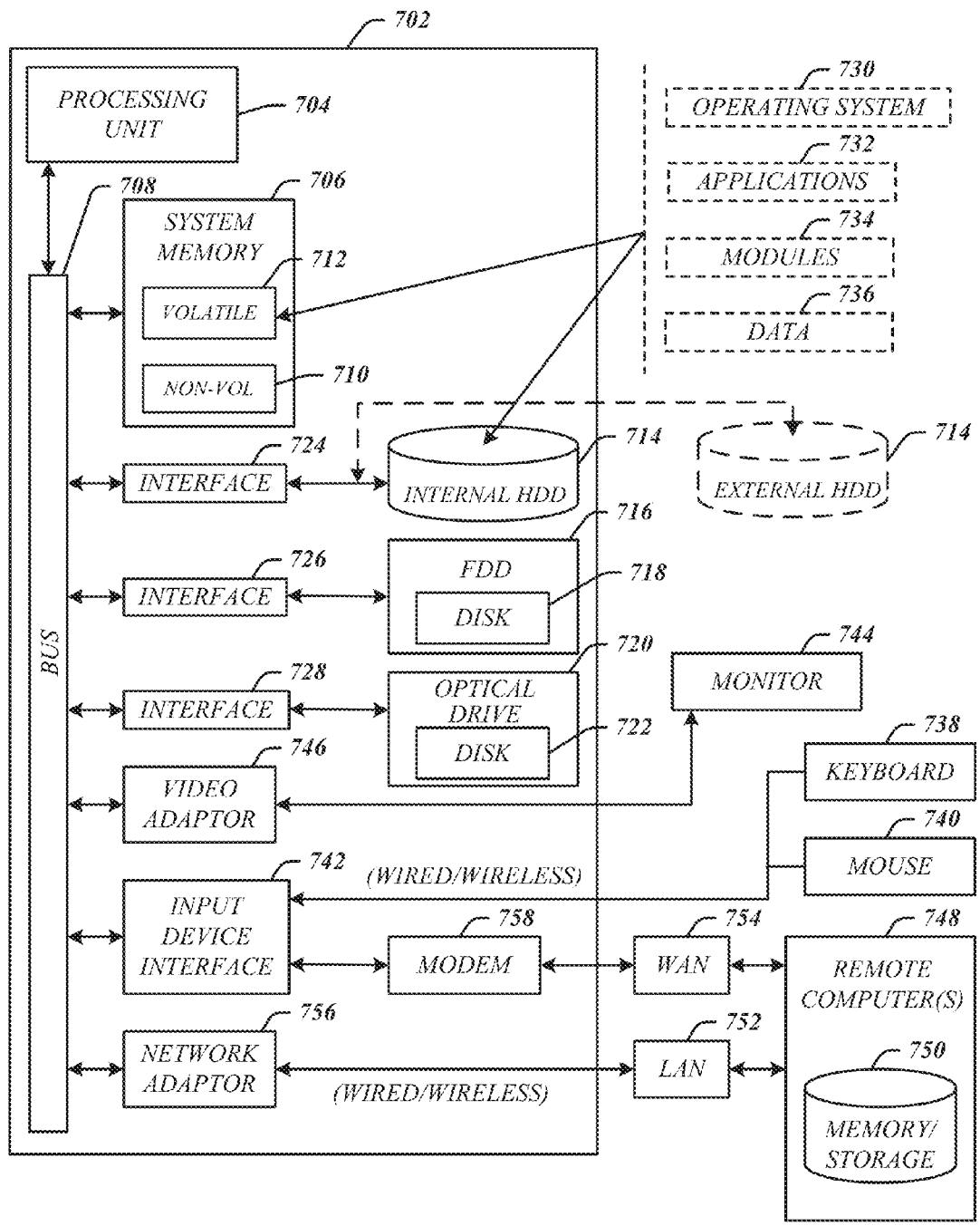
FIG. 7 illustrates an embodiment of a computing architecture.

FIG. 7 illustrates an embodiment of an exemplary computing architecture 700 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 700 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The computing architecture 700 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

The one or more application programs 732, other program modules 734, and program data 736 can include, for example, the pyramid level search component 122, the pixel search range component 124 and the correlation component 126.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
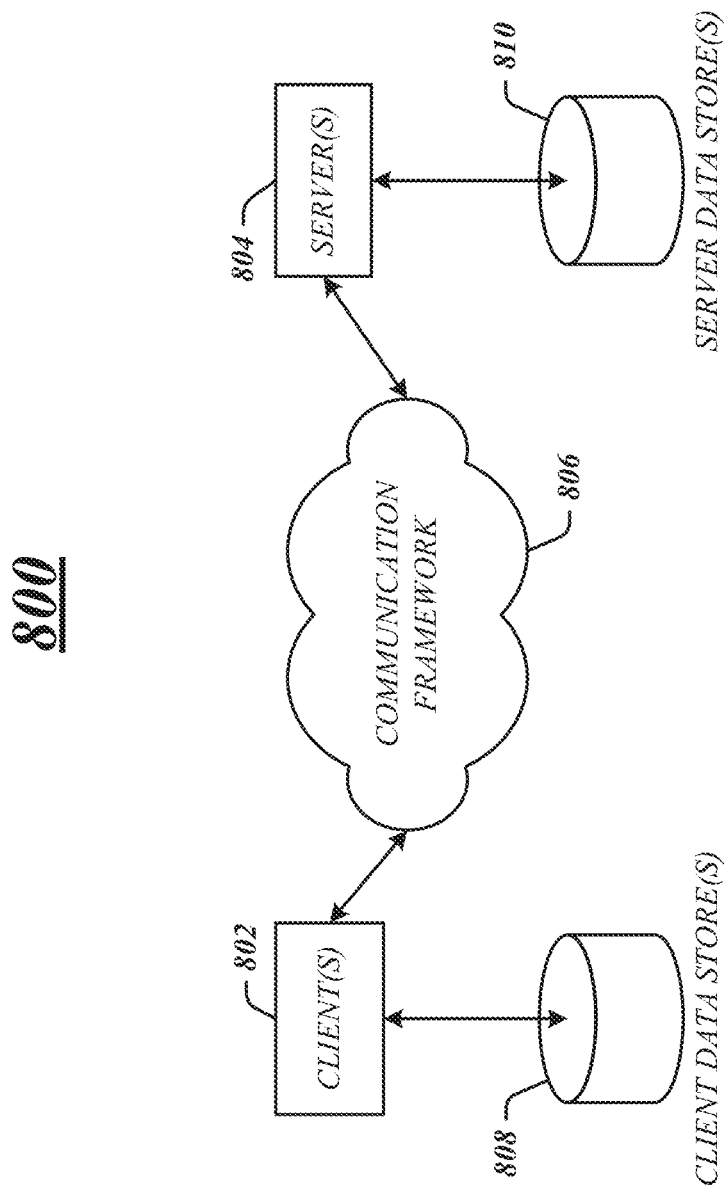
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques and protocols, such as those described with reference to systems 300 and 700. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An article of manufacture comprising a storage medium containing instructions that when executed cause a system to:
receive a first disparity estimation value for a first level in a stereo based matching pyramid based on an image;
determine a search range for a second level based on the first disparity estimation value;
increase the search range based on a pyramid level of the second level; and
select a second disparity estimation value from the search range for the second level based on a sum of absolute differences on a gradient times an absolute difference of a gray.

2. The article of manufacture of claim 1, comprising instructions that when executed cause the system to determine a depth map for the second level based on the second disparity estimation value.

3. The article of manufacture of claim 1, comprising instructions that when executed cause the system to:
calculate a Laplacian value; and
determine the search range within the second level based on the Laplacian value.

4. The article of manufacture of claim 1, comprising instructions that when executed cause the system to select the second disparity estimation value based on a correlation score.

5. The article of manufacture of claim 1, comprising instructions that when executed cause the system to determine that a second level image on the second level includes a thin object that was not included on a first level image on the first level.

6. The article of manufacture of claim 1, comprising instructions that when executed cause the system to select the second disparity estimation value based on a local binary pattern.

7. An apparatus, comprising:
a processing component;
a pyramid level search range component operatively coupled to the processing component to:
determine a search range for a second level based on a first disparity estimation value from a first level;
increase the search range based on a pyramid level of the second level; and
select a second disparity estimation value from the search range for the second level; and
a correlation component to determine a correlation score based on a sum of absolute differences on a gradient times an absolute difference of a gray.

8. The apparatus of claim 7, comprising:
a digital display operatively coupled to the processing component.

9. The apparatus of claim 7, comprising:
a pixel search range component to:
calculate a Laplacian value; and
determine the search range within the second level based on the Laplacian value.

10. The apparatus of claim 7, comprising:
a pixel search range component to:
determine that a target object is in the search range for the second level;
determine that the target object is not presented in the first level; and
increase the search range within the second level.

11. The apparatus of claim 7, comprising:
a pixel search range component to increase the search range within the second level when the search range comprises edges.

12. The apparatus of claim 7, comprising:
a correlation component to determine a correlation score based on a local binary pattern.

13. A method, comprising:
receiving, at a processing component, a first image from a first camera and a second image from a second camera and from a camera;
determining, by the processing component, a stereo based matching pyramid from at least one of the first and second images;
receiving a first disparity estimation value for a first level in the stereo based matching pyramid;
determining, by the processing component, a search range for a second level based on the first disparity estimation value;
increasing the search range based on a pyramid level of a second level;
selecting, by the processing component, a second disparity estimation value from the search range for the second level;
determining, by the processing component, a depth map for the second level based on the second disparity estimation value; and
determining, by the processing component, a correlation score based on a sum of absolute differences on a gradient times an absolute difference of a gray.

14. The method of claim 13, comprising:
calculating a Laplacian value; and
determining the search range within the second level based on the Laplacian value.

15. The method of claim 13, comprising:
selecting a second disparity estimation value from the search range for the second level based on a correlation score.

16. The method of claim 13, comprising:
increasing the search range within the second level when the search range comprises edges.

17. The method of claim 13, comprising:
determining a correlation score based on a local binary pattern.

18. A system, comprising:
a processing component;
a memory to store a depth extraction application;
an operating system to load the stereo block matching pyramid application on the processing component, the stereo block matching pyramid application operative on the processing component to:
determine a search range for a second level based on the first disparity estimation value;
increase the search range based on a pyramid level of a second level;
select a second disparity estimation value from the search range for the second level, and
determine a depth map for the second level based on the second disparity estimation value;
an interface to communicate information between the processing component and the operating system; and
determine a correlation score based on a sum of absolute differences on a gradient times an absolute difference of a gray.

19. The system of claim 18, comprising a pixel search range component in the stereo block matching application operating on the processing component to:
determine that a target object is in the search range for the second level;
determine that the target object is not presented in the first level; and
increase the search range within the second level.

20. The system of claim 18, comprising a pixel search range component in the stereo block matching application operating on the processing component to:
   increase the search range within the second level when the search range comprises edges.

21. The system of claim 18, comprising a correlation component in the stereo block matching application operating on the processing component to:
   determine a correlation score based on a local binary pattern.

* * * * *